No. 827,287. PATENTED JULY 31, 1906.
E. BIDTEL.
METHOD OF LAYING PATTERNED CEMENT FLOORS.
APPLICATION FILED NOV. 11, 1904.

Witnesses:
E. F. Wilson
F. Schlotfeld

Inventor:
Ernst Bidtel
By Rudolph
Attorney.

UNITED STATES PATENT OFFICE.

ERNST BIDTEL, OF HOBOKEN, NEW JERSEY, ASSIGNOR, BY DIRECT AND MESNE ASSIGNMENTS, TO AMERICAN HYDROLIT COMPANY, OF HOBOKEN, NEW JERSEY, A CORPORATION OF NEW JERSEY.

METHOD OF LAYING PATTERNED CEMENT FLOORS.

No. 827,287. Specification of Letters Patent. Patented July 31, 1906.

Application filed November 11, 1904. Serial No. 232,360.

*To all whom it may concern:*

Be it known that I, ERNST BIDTEL, a citizen of the United States, residing at Hoboken, in the county of Hudson and State of New Jersey, have invented certain and useful Improvements in Methods of Laying Patterned Cement Floors; and I do hereby declare the following to be a full, clear, and exact description of the invention, such as will enable others skilled in the art to which it appertains to make and use the same.

My invention relates to a novel method of laying cement parquette floors, the object being to provide means for so laying the floors as to produce a pattern of any desired kind and colors and making same absolutely without interstices between the divisions or tiles, thereby making same absolutely waterproof, and enabling same to be handsomely finished; and it consists in the various steps or operations hereinafter fully described and claimed.

Figure 1:
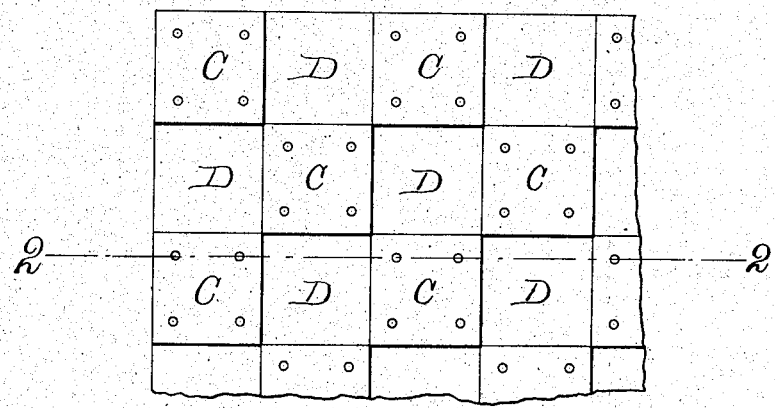
Figure 2:
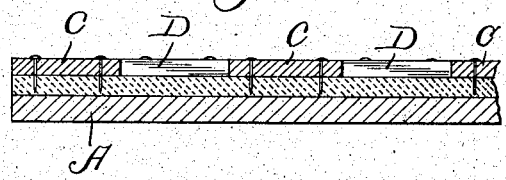
Figure 3:
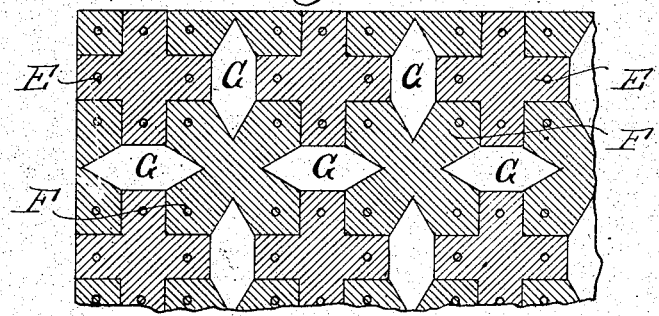

In the accompanying drawings, illustrating my invention, Figure 1 is a plan view of a floor constructed in accordance with my method. Fig. 2 is a section of same on the line 2 2 of Fig. 1. Fig. 3 is a plan view showing a floor in plan in a three-color pattern.

My invention relates more particularly to floors of magnesia cement, but may be applied to the construction of floors of any other suitable material.

A floor laid in accordance with my invention may be superimposed on a wood, concrete, or other floor, which forms a base or foundation therefor.

My method consists in first laying upon a floor or other suitable foundation A a layer of cement B. The said layer B is preferably of magnesia cement, for the reason that such cement has greater adhesive properties than other kinds and will adhere very tenaciously to wood as well as to stone, concrete, brick, &c. It is also preferable by reason of the fact that it is more elastic, harder, and more durable than Portland or other cement and will not crack or chip as readily. The said layer B is smoothed or leveled on the surface, and the pattern to be reproduced in the floor is then drawn thereon. If said pattern comprehends the use of divisions of the same shape and size and of only two colors—such, for instance, as squares—as shown in Fig. 1, then after reproducing on the layer B the divisions of such pattern alternate squares of each row are covered by a plate C, of rubber, caoutchouc, or other material to which the cement will not adhere, such plates being secured in place by nails or in any other suitable manner, and adjacent rows thereof are relatively staggered. The spaces or squares D between said plates are then filled with the cement of one color to the height of the plates C, and said cement is then allowed to set. The said plates C are then removed, and cement of another color is introduced in the spaces left thereby and filled in flush with the first-laid squares and allowed to set. The cement thus introduced not only binds with the layer B, but the various squares bind with each other on their edges, so that the entire structure becomes substantially homogeneous. The upper surface of the floor may then be ground down and finished as desired, the result being a floor having a sharply-defined pattern and entirely devoid of cracks or interstices between adjacent parts of the pattern. This method may be employed in reproducing patterns in three or more colors and in imitation of any kind of tiles, as illustrated in Fig. 3, it being necessary after first drawing the design on the layer B to block out with plates E and F two of the divisions of a three-color design and fill in the remaining spaces G with cement of one of the colors. By then removing the plates E and filling the spaces left thereby with the second color and then removing the plates F and filling in the third color the complete pattern is reproduced in the desired colors. Any number of colors and any pattern may be thus readily reproduced and at the same time a floor of superior quality produced.

I claim as my invention—

The herein-described method of making magnesia-cement floors consisting in laying the main body of the floor on the foundation around patterned segregated templets made of rubber or equivalent material, then removing such templets and filling the space left by their removal with suitable permanent material.

In testimony whereof I have signed my name in presence of two subscribing witnesses.

ERNST BIDTEL.

Witnesses:
RUDOLPH WM. LOTZ,
F. SCHLOTFELD.